United States Patent
Stamenovic et al.

(10) Patent No.: US 11,750,984 B2
(45) Date of Patent: Sep. 5, 2023

(54) MACHINE LEARNING BASED SELF-SPEECH REMOVAL

(71) Applicant: Bose Corporation, Framingham, MA (US)

(72) Inventors: Marko Stamenovic, Jamaica Plain, MA (US); Andrew Todd Sabin, Chicago, IL (US); Jahn Dmitri Eichfeld, Natick, MA (US)

(73) Assignee: Bose Corporation, Framingham, MA (US)

( * ) Notice: Subject to any disclaimer, the term of this patent is extended or adjusted under 35 U.S.C. 154(b) by 195 days.

(21) Appl. No.: 17/032,801

(22) Filed: Sep. 25, 2020

(65) Prior Publication Data

US 2022/0103951 A1 Mar. 31, 2022

(51) Int. Cl.
*H04R 25/00* (2006.01)
*G10L 15/20* (2006.01)

(52) U.S. Cl.
CPC .............. *H04R 25/45* (2013.01); *G10L 15/20* (2013.01); *H04R 2225/43* (2013.01)

(58) Field of Classification Search
CPC ....... H04R 25/00; H04R 25/40; H04R 25/505
USPC ........................................ 381/312, 313, 317
See application file for complete search history.

(56) References Cited

U.S. PATENT DOCUMENTS

| | | | | |
|---|---|---|---|---|
| 6,157,403 A | * | 12/2000 | Nagata | H04R 3/005 |
| | | | | 348/172 |
| 2009/0043588 A1 | * | 2/2009 | Takeda | G10L 21/0272 |
| | | | | 704/E21.001 |
| 2012/0259626 A1 | * | 10/2012 | Li | G10L 21/0208 |
| | | | | 704/226 |
| 2016/0005414 A1 | * | 1/2016 | Lainez | G10L 25/69 |
| | | | | 704/226 |
| 2016/0111089 A1 | * | 4/2016 | Kim | G10L 13/08 |
| | | | | 704/239 |
| 2018/0286410 A1 | | 10/2018 | Jin et al. | |
| 2019/0020957 A1 | | 1/2019 | Kamkar-Parsi et al. | |
| 2019/0394586 A1 | | 12/2019 | Pedersen et al. | |
| 2022/0139401 A1 | * | 5/2022 | Chen | G10L 25/78 |
| | | | | 704/232 |

FOREIGN PATENT DOCUMENTS

EP 2242289 A1 10/2010

OTHER PUBLICATIONS

PCT International Search Report and Written Opinion for International Application No. PCT/US2021/050039, dated Jan. 5, 2022, 20 pages.

(Continued)

*Primary Examiner* — George C Monikang
(74) *Attorney, Agent, or Firm* — Hoffman Warnick LLC (57) ABSTRACT

Various implementations include systems for processing audio signals. In particular implementations, a process includes receiving an audio signal, wherein the audio signal includes a speech component of the user and a noise component; filtering the audio signal with a self-speech filter that utilizes an intrinsic user vector to filter out the speech component, wherein the intrinsic user vector is determined based on a voice input of the user; and outputting a filtered audio signal in which the speech component of the user has been substantially removed from the audio signal.

23 Claims, 5 Drawing Sheets

(56) References Cited

OTHER PUBLICATIONS

Wang et al., "VoiceFilter: Targeted Voice Separation by Speaker-Conditioned Spectrogram Masking," arxiv.org, Cornell University Library, Oct. 11, 2018, 5 pages.
Ji et al., "Speaker-Aware Target Speaker Enhancement by Jointly Learning with Speaker Embedding Extraction," ICASSP 2020—2020 IEEE International Conference on Acoustics, Speech and Signal Processing, May 4, 2020, pp. 7294-7298.

* cited by examiner

MACHINE LEARNING BASED SELF-SPEECH REMOVAL

TECHNICAL FIELD

This disclosure generally relates to wearable hearing assist devices. More particularly, the disclosure relates to a machine learning based approach for removing user voice signals in wearable hearing assist devices.

BACKGROUND

Wearable hearing assist devices can significantly improve the hearing experience for a user. For instance, such devices typically employ one or more microphones and amplification components to amplify desirable sounds such as the voice or voices of others speaking to the user. Additionally, such devices may employ technologies such as active noise reduction (ANR) for countering unwanted environmental noise. Wearable hearing assist devices may come in various form factors, e.g., headphones, earbuds, audio glasses, etc. However, removing unwanted acoustic signals, such as a user's own voice signals, continues to present various technical challenges.

SUMMARY

All examples and features mentioned below can be combined in any technically possible way.

Systems and approaches are disclosed that employ a wearable hearing assist device that removes a user's speech. Some implementations include: receiving an audio signal, wherein the audio signal includes a speech component of the user and a noise component; filtering the audio signal with a self-speech filter that utilizes an intrinsic user vector to filter the speech component, wherein the intrinsic user vector is determined based on a voice input of the user; and outputting a filtered audio signal in which the speech component of the user has been substantially removed from the audio signal.

In additional particular implementations, a system is provided that includes a memory and a processor coupled to the memory and configured to remove user speech for a hearing assist device according to a method that includes: receiving an audio signal, wherein the audio signal includes a speech component of the user and a noise component; filtering the audio signal with a self-speech filter that utilizes an intrinsic user vector to filter out the speech component, wherein the intrinsic user vector is determined based on a voice input of the user; and outputting a filtered audio signal in which the speech component of the user has been substantially removed from the audio signal.

Implementations may include one of the following features, or any combination thereof.

In some cases, the intrinsic user vector is determined during an offline session and includes an intrinsic compressed representation of speech patterns of the user.

In other cases, the intrinsic compressed representation includes one of: a d-vector representation or an i-vector representation.

In certain aspects, the self-speech filter includes a machine learning model that is trained offline according to a method that includes: providing a set of intrinsic user vectors, each corresponding to a unique user, and an associated mixed audio signal for each unique user, wherein each associated mixed audio signal includes a speech component of the unique user and a corresponding noise component; inputting into the machine learning model a selected intrinsic user vector and the associated mixed audio signal; training the machine learning model to remove the speech component from the associated mixed audio signal based on the selected intrinsic user vector; and repeating the inputting and training steps for each intrinsic user vector.

In particular implementations, the method includes post processing the filtered audio signal to generate an enhanced filtered audio signal; and outputting the enhanced filtered audio signal to an electroacoustic transducer to generate an acoustic signal.

In some cases, the post processing includes at least one of: speech enhancement, signal-to-noise ratio (SNR) improvement, beamforming, or active noise reduction.

In certain aspects, the hearing assist device includes a head worn device having at least one earphone and an accessory device in communication with the head worn device.

In some implementations, the self-speech filter is contained in the accessory device.

In certain cases, the self-speech filter is contained in the head worn device.

In some implementations, the offline session is used to determine the intrinsic user vector with a speech characterization system that includes a machine learning model trained using a database of voice inputs from a plurality of speakers.

In certain aspects, the self-speech filter includes at least one audio processing enhancement selected from a group consisting of: signal-to-noise ratio (SNR) improvement, beamforming, or active noise reduction.

In other aspects, a system is provided that perform a method of: receiving an audio signal, wherein the audio signal includes a targeted speech component of a non-device user and a noise component; filtering the audio signal with a targeted speech enhancer that utilizes an intrinsic user vector to substantially pass only the targeted speech component, wherein the intrinsic user vector is determined based on a voice input of the non-device user; and outputting a speech enhanced audio signal substantially containing only the targeted speech component.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various implementations describe solutions for removing a user's own voice in a wearable hearing assist device ("self-speech removal"). In general, when using a hearing assist device, the user can be annoyed or otherwise irritated by amplification of the user's own voice. However, amplification of others' voices is critical for audibility.

In a hearing assist device, such as a hearing aid, an audio augmented reality system, a system utilizing a remote microphone (e.g., from a phone or other device) that streams to a headphone, etc., sounds are transmitted to the ear via two different paths. The first path is the "direct path" where sound travels around the device or headphone and directly into the ear canal. In the second, "processed path," the audio travels through the hearing assist device or headphone, is processed, and is then delivered to the ear canal through the driver (i.e., electrostatic transducer or speaker).

A key factor in the performance of any hearing assist device when processing real time audio for human consumption is latency created by the algorithm processing signals along the processed path. Latency is defined as the delay (usually measured in milliseconds) between the time the audio enters the device to when it emerges. Excessive latency in a system can significantly degrade the perceived quality of the algorithm, as well as the user experience.

If the overall system latency is above a certain threshold (for example on the order of 5 to 20 milliseconds), it can be extremely disconcerting and annoying to users. More precisely, this threshold is driven by human sensitivity to latency on their own voice in the processed path. However, if the user's own voice is not present in the processed path, users can tolerate latency much better, and the overall system latency threshold increases significantly (for example, up to approximately 80-150 ms.).

This disclosure describes implementations to remove the user's own voice (i.e., self-speech) from the processed path using machine learning based processing, thus effectively increasing the latency budget for audio processing.

Although generally described with reference to hearing assist devices, the solutions disclosed herein are intended to be applicable to a wide variety of wearable audio devices, i.e., devices that are structured to be at least partly worn by a user in the vicinity of at least one of the user's ears to provide amplified audio for at least that one ear. Other such implementations may include headphones, two-way communications headsets, earphones, earbuds, hearing aids, audio eyeglasses, wireless headsets (also known as "earsets") and ear protectors. Presentation of specific implementations are intended to facilitate understanding through the use of examples, and should not be taken as limiting either the scope of disclosure or the scope of claim coverage.

Additionally, the solutions disclosed herein are applicable to wearable audio devices that provide two-way audio communications, one-way audio communications (i.e., acoustic output of audio electronically provided by another device), or no communications, at all. Further, what is disclosed herein is applicable to wearable audio devices that are wirelessly connected to other devices, that are connected to other devices through electrically and/or optically conductive cabling, or that are not connected to any other device, at all. These teachings are applicable to wearable audio devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), in-the-ear or behind-the-ear hearing aids, wireless headsets (i.e., earsets), audio eyeglasses, single earphones or pairs of earphones, as well as hats, helmets, clothing or any other physical configuration incorporating one or two earpieces to enable audio communications and/or ear protection.

In the illustrative implementations, the processed audio may include any natural or manmade sounds (or, acoustic signals) and the microphones may include one or more microphones capable of capturing and converting the sounds into electronic signals.

In various implementations, the wearable audio devices (e.g., hearing assist devices) described herein may incorporate active noise reduction (ANR) functionality that may include either or both feedback-based ANR and feedforward-based ANR, in addition to possibly further providing pass-through audio and audio processed through typical hearing aid signal processing such as dynamic range compression.

Additionally, the solutions disclosed herein are intended to be applicable to a wide variety of accessory devices, i.e., devices that can communicate with a wearable audio device and assist in the processing of audio signals. Illustrative accessory devices include smartphones, Internet of Things (IoT) devices, computing devices, specialized electronics, vehicles, computerized agents, carrying cases, charging cases, smart watches, other wearable devices, etc.

In various implementations, the wearable audio device (e.g., hearing assist device) and accessory device communicate wirelessly, e.g., using Bluetooth, or other wireless protocols. In certain implementations, the wearable audio device and accessory device reside within several meters of each other.

Figure 1:
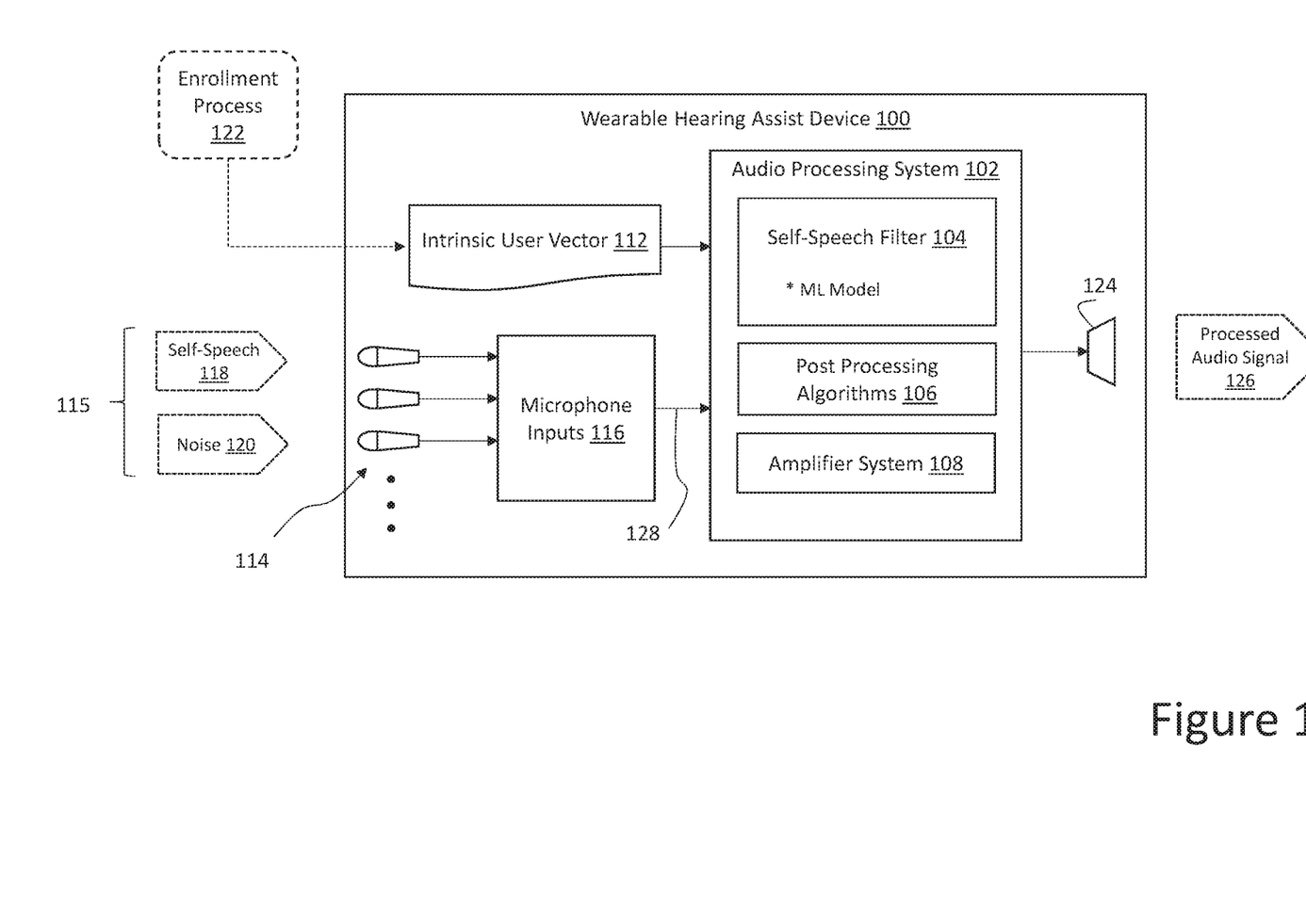
FIG. 1 depicts a block diagram of a wearable hearing assist device according to various implementations.

FIG. 1 depicts an illustrative implementation of a wearable hearing assist device 100 that utilizes a machine learning (ML) based approach to output a processed audio signal 126 in which self-speech 118 is removed or substantially removed. As shown, device 100 includes a set of microphones 114 configured to receive a mixed acoustic input 115 that includes a mixture of self-speech 118 and noise 120. Noise 120 generally includes all other acoustic inputs other than self-speech 118, e.g., other speech, background voices, environmental sounds, music, etc. Microphone inputs 116 receive mixed audio signals from the microphones 114 and pass the mixed audio signals 128 to audio processing system 102.

Audio processing system 102 includes a self-speech filter 104 that includes a trained machine learning (ML) model configured to process the mixed audio signals 128. More specifically, the self-speech filter 104 uses an intrinsic user vector 112, e.g., created during an enrollment process (or, phase) 122 based on the user's voice, to remove self-speech 118 of the user. In certain implementations, the intrinsic user vector 112, which includes an intrinsic compressed representation of speech patterns of the user, is determined during the enrollment process 122. In other implementations, the intrinsic user vector 112 can be calculated by device 100. The ML process for generating the intrinsic user vector 112 and self-speech filter 104 is described further herein, e.g., with reference to FIG. 2. Once the mixed audio signals 128 are processed with the self-speech filter 104 to remove self-speech of the user (i.e., the user of the wearable hearing assist device 100), post processing algorithms 106 can further enhance the filtered signal, e.g., by providing speech enhancement, signal-to-noise (SNR) improvement, beamforming, active noise reduction, etc. The resulting signal is then amplified by amplifier system 108 and output over electro-acoustic transducer 124.

Figure 2:
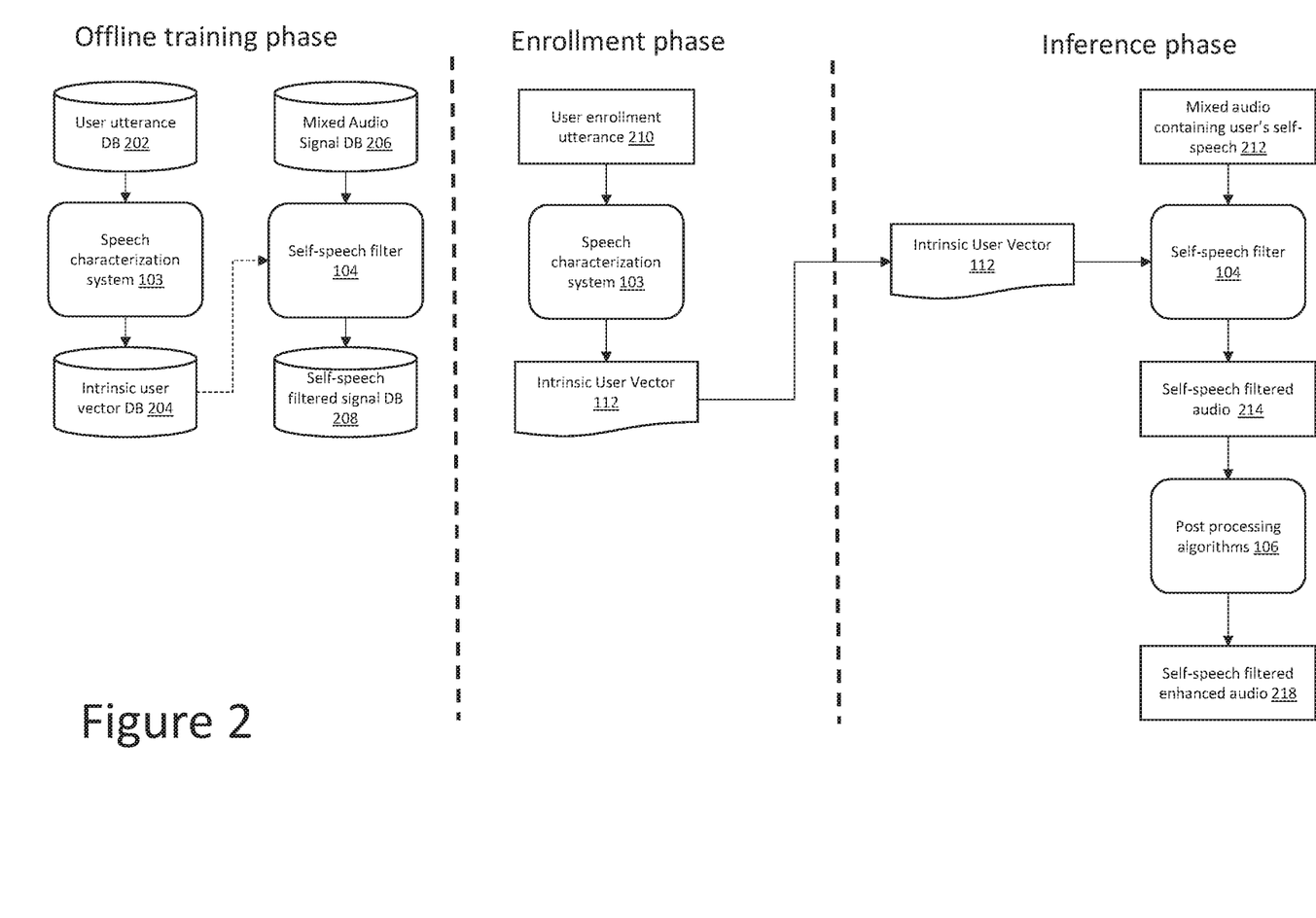
FIG. 2 depicts a machine learning platform for implementing self-speech removal according to various implementations.

FIG. 2 depicts an illustrative overview of the machine learning based process utilized to implement a self-speech filter 104 and calculate the intrinsic user vector 112, such as that shown with device 100 (FIG. 1). The process may be implemented in three phases, including: an offline training phase, an enrollment phase, and an inference phase. An implementation of the inference phase was described in FIG. 1, in which device 100 filters self-speech of the user during operation of the device 100 by the user. The enrollment phase can for example be implemented as a one-time or as-needed operation when a new user begins using the device 100. In various implementations, the offline training phase is responsible for training two ML based models required for the other phases, namely, a speech characterization system 103 and the self-speech filter 104.

In certain implementations, speech characterization system 103 (first model) is trained with a user utterance database (DB) 202 and an associated intrinsic user vector DB 204, e.g., using a neural network or the like. For example, the first model can be trained with user utterance/expected intrinsic user vector pairs. User utterances are inputted into the speech characterization system 103 to generate an intrinsic user vector. The generated intrinsic user vector can be compared to an expected intrinsic user vector from the intrinsic user vector DB 204, with results being fed back to adjust the first model. The training can continue until each user utterance from the user utterance database (DB) 202 entered into the model reliably outputs its expected intrinsic user vector. Once trained, the resulting speech characterization system 103 can be used in the enrollment phase to map a new (or enrolling) user's utterance to an intrinsic user vector 112 that is explicitly associated with the new user. The intrinsic user vector 112 generally consists of an intrinsic compressed representation of the user's speech patterns. The intrinsic compressed representation may for example include a d-vector representation or an i-vector representation. As is readily understood in the art, various algorithms exist to extract d-vectors and i-vectors based on a voice sample of the user.

Self-speech filter 104 (second model), which is likewise trained offline using a neural network or the like, is trained to remove a person's speech from a mixed audio signal (i.e., an audio signal containing both self-speech 118 and noise 120) using an intrinsic user vector of the person. For example, this model can be trained by inputting a mixed audio signal from a mixed audio signal DB 206 along with an associated intrinsic user vector to obtain a self-speech filtered signal, which can be compared to an expected signal in the self-speech filtered signal database 208. Results can be fed back to adjust and tune the second model. Once trained, the resulting self-speech filter 104 can be deployed in the inference phase (e.g., on device 100).

During the enrollment phase, the user is, for example, instructed to record a short audio clip of themselves speaking a predefined set of utterances. This can be done on the device 100 itself or on an accessory device such as a mobile phone or coprocessor. Systems or guidance may be utilized to ensure the recording contains only the user's voice and no other interfering audio or speech. For example, the user may be instructed to speak the utterances in a quiet space, and/or the resulting audio clips can be analyzed to ensure there is no unwanted noise. The recorded enrollment utterance is then passed through the speech characterization system 103 (either on the device 100 itself, on a companion device, in the cloud, etc.), and the intrinsic user vector 112 for the enrolling user is extracted.

Once the intrinsic user vector 112 is extracted, it is loaded and stored, e.g., on device 100, and the inference phase can be implemented. During this phase, mixed audio containing the user's self-speech 212 is first sent to the self-speech filter 104 along with the user's intrinsic vector 112 to remove the user's own voice from the processed path. The resulting self-speech filtered audio 214 is then passed to any downstream post processing algorithms 106, such as speech enhancement, SNR improvement, beamforming, ANR, etc. Finally, the self-speech filtered, enhanced audio 218 is sent to the driver to be reproduced in the ear canal of the user.

Due to the fact that the user's own voice has been removed from the processed path during the inference phase, the user is able to tolerate much higher processing latency than they would with an audio signal that contains their self-speech. This higher tolerance to latency enables more complex downstream post processing algorithms 106, such as algorithms implemented on an accessory, such as a smart phone or wireless coprocessor device, which accumulate latency not only from algorithmic processing but also from the wireless transmission of audio.

Figure 3:
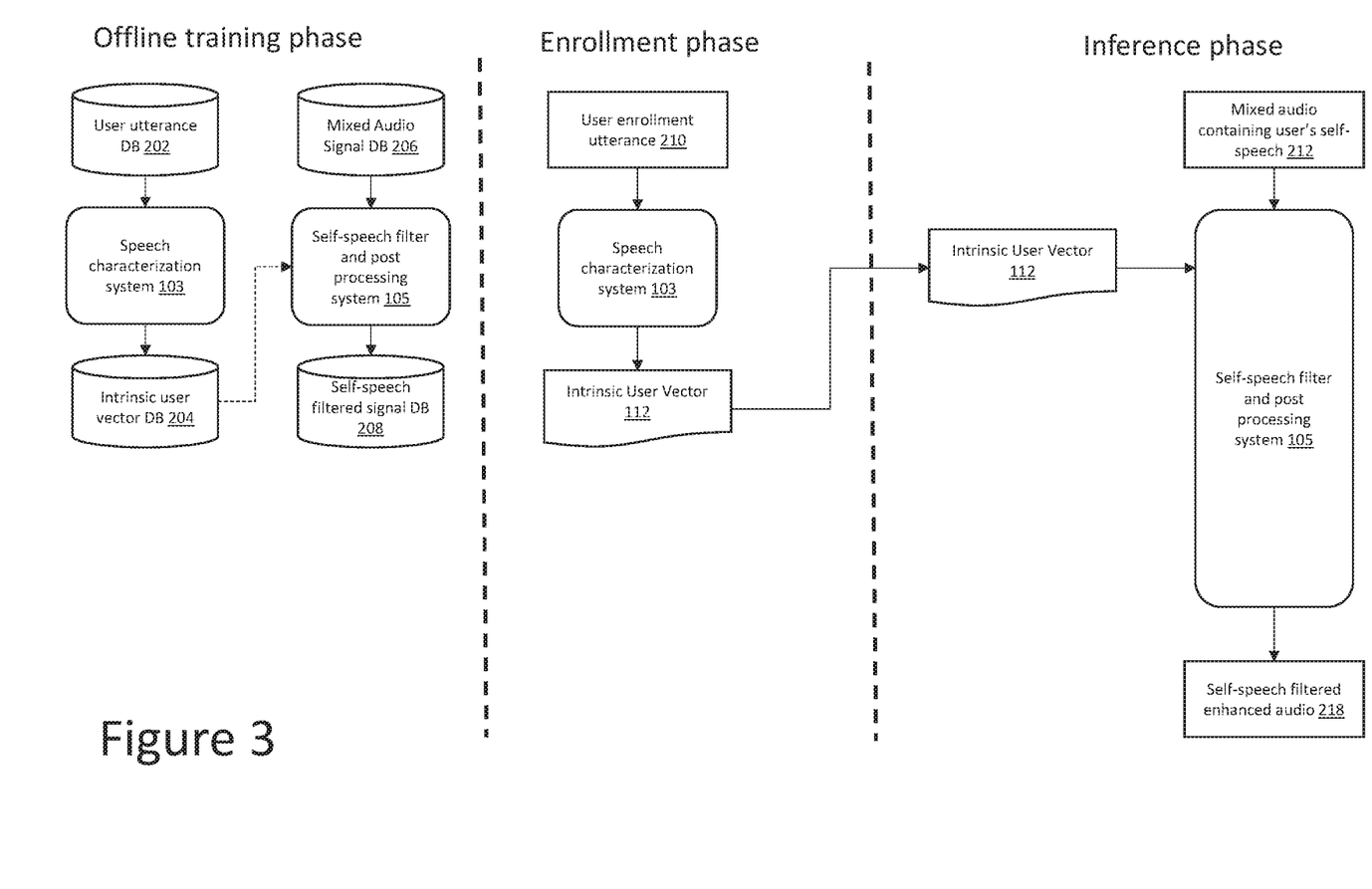
FIG. 3 depicts an alternative machine learning platform for implementing self-speech removal according to various implementations.

FIG. 3 depicts an alternative embodiment in which the self-speech filter 104 and post processing algorithms 106 of FIG. 2 are combined into a single system, i.e., self-speech filter and post processing system 105. In this manner, processing enhancements, such as speech enhancement, SNR improvement, beamforming, ANR, etc., are handled by a single system or machine learning trained model.

Figure 4:
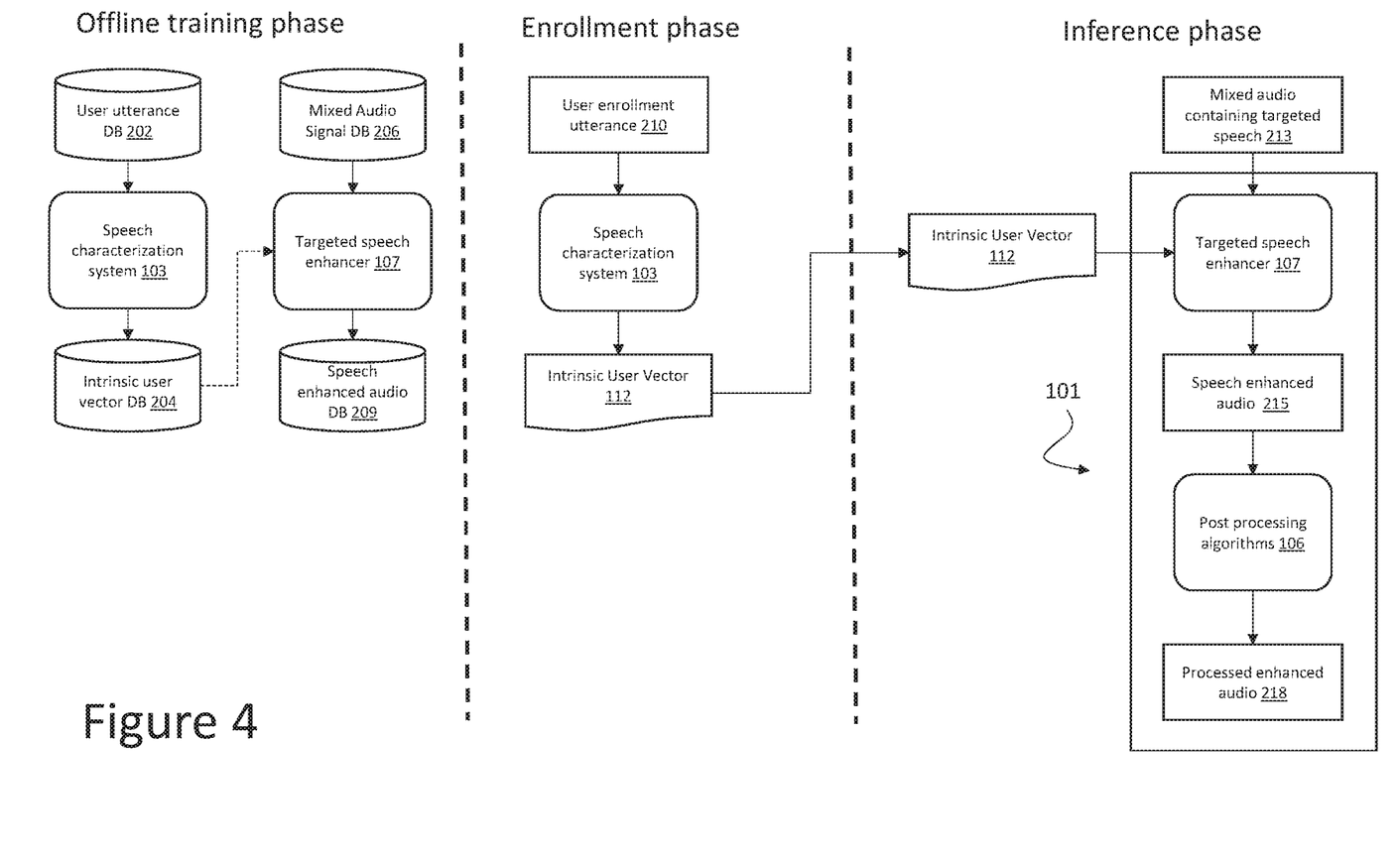
FIG. 4 depicts a machine learning platform for implementing target speech enhancement according to various implementations.

FIG. 4 depicts a further implementation in which a similar machine learning platform is utilized to provide speech enhanced audio 215, either as a stand-alone or in addition to the herein described self-speech filtering platform. In this case, the platform creates an intrinsic user vector designed to pass speech from one or more non-device users (i.e., targeted speech). Instead of training a model to remove the speech corresponding to the intrinsic user vector (i.e., self-speech filter 104 of FIG. 2), a model, in this case targeted speech enhancer 107, is trained to keep the targeted speech of a non-device user. Targeted speech enhancer 107 is trained by processing mixed audio signals (that include targeted speech and noise) with associated intrinsic user vectors to dependably generate speech enhanced audio 209 that only includes targeted speech. Speech characterization system 103 is trained in the same manner as with the self-speech filtering platform.

Accordingly, a user of device 101 could choose to only hear speech from their partner by enrolling their partner with speech characterization system 103, and loading their partner's intrinsic user vector 112 into targeted speech enhancer 107. When a mixed audio 213 containing their partner's speech, i.e., target speech, is presented to the device 101, targeted speech enhancer 107 generates speech enhanced audio 215 that substantially only includes their partner's speech. Processed enhanced audio 219 may thereafter be generated from post processing algorithms 106. In an alternative embodiment, post processing algorithms 106 may be incorporated into target speech enhancer 107.

The process may be expanded to handle multiple targets whose speech is allowed to pass simply by enrolling multiple users that will each generate an intrinsic user vector 112. Multiple intrinsic user vectors 112 can then be inputted to targeted speech enhancer 107.

It is understood that the devices 100, 101 (FIGS. 1-4) shown and described according to various implementations may be structured to be worn by a user to provide an audio output to a vicinity of at least one of the user's ears. The devices 100, 101 may have any of a number of form factors, including configurations that incorporate a single earpiece to provide audio to only one of the user's ears, others that incorporate a pair of earpieces to provide audio to both of the user's ears, and others that incorporate one or more stand-alone speakers to provide audio to the environment around the user. Example wearable audio devices are illustrated and described in further detail in U.S. Pat. No. 10,194,259 (Directional Audio Selection, filed on Feb. 28, 2018), which are hereby incorporated by reference in its entirety.

In the illustrative implementations, the acoustic input 115 (FIG. 1) may include any ambient acoustic signals, including acoustic signals generated by the user of the wearable hearing assist device, including, e.g., natural or manmade sounds (or, acoustic signals). The microphones 114 may include one or more microphones (e.g., one or more microphone arrays including a feedforward and/or feedback microphone) capable of capturing and converting the sounds into electronic signals.

It is appreciated that while a few examples have been provided herein relating to removing a user's voice in a hearing assist device, other approaches, or combinations of described approaches can be used.

Figure 5:
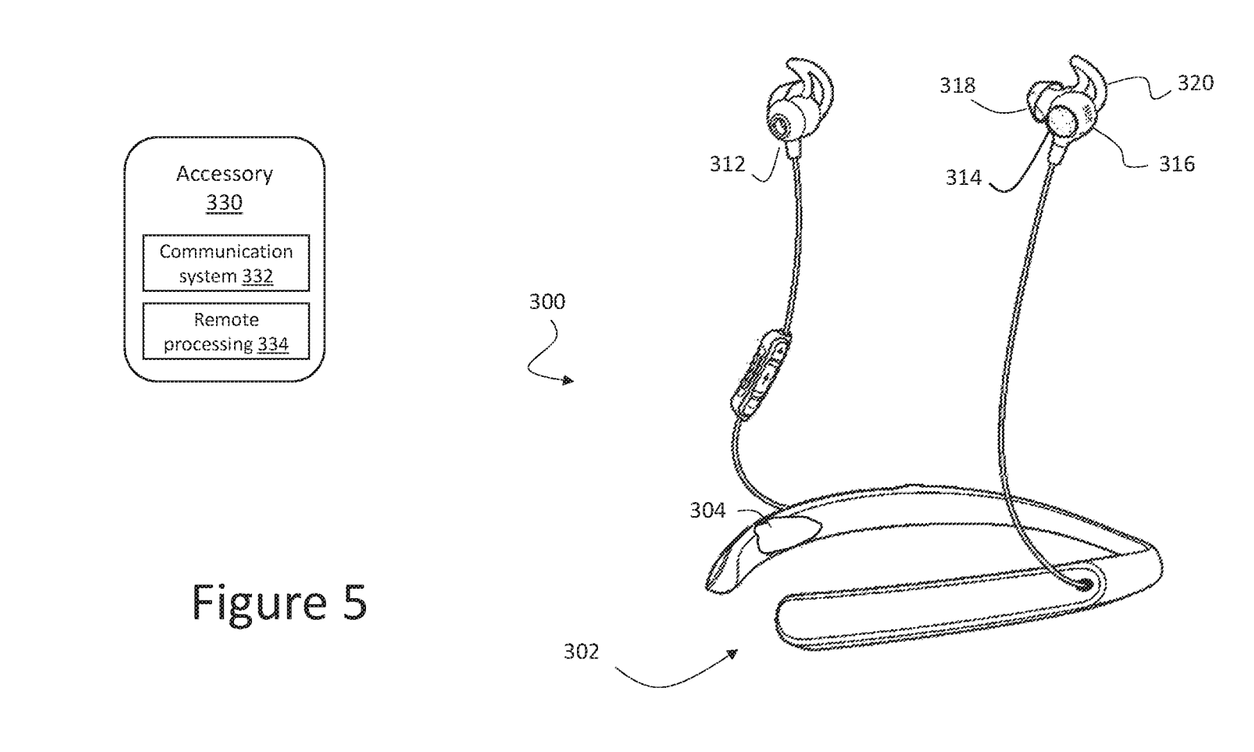
FIG. 5 depicts an example of a wearable hearing assist device according to various implementations.

FIG. 5 is a schematic depiction of an illustrative wearable hearing assist device 300 (in one example form factor) that includes a self-speech removal system contained in housing 302. It is understood that the example wearable hearing assist device 300 can include some or all of the components and functionality described with respect to devices 100, 101 depicted and described with reference to FIGS. 1-4. The self-speech removal system and/or target speech enhancer can be one of, or can be executed on one or more of a variety of electronics 304 in the housing 302. In certain embodiments, some or all of the self-speech or enhancement algorithms may be implemented in an accessory 330 that is configured to communicate with the wearable hearing assist device 300. In this example, the wearable audio device 300 includes an audio headset that includes two earphones (for example, in-ear headphones, also called "earbuds") 312, 314. While the earphones 312, 314 are tethered to a housing 302 (e.g., neckband) that is configured to rest on a user's neck, other configurations, including wireless configurations can also be utilized. Each earphone 312, 314 is shown including a body 316, which can include a casing formed of one or more plastics or composite materials. The body 316 can include a nozzle 318 for insertion into a user's ear canal entrance and a support member 320 for retaining the nozzle 318 in a resting position within the user's ear. In addition to the self-speech removal system, the control unit 302 can include other electronics 304, e.g., an amplifier, batteries, user controls, a voice activity detection (VAD) device, etc.

In certain implementations, as noted above, a separate accessory 330 can include a communication system 332 to, e.g., wirelessly communicate with device 300 and includes remote processing 334 to provide some or all of the functionality described herein, e.g., the self-speech filter 104, the enrollment process 122, post processing algorithms 106, etc. Accessory 330 can be implemented in many embodiments. In one embodiment, the accessory 330 comprises a stand-alone device. In another embodiment, the accessory 330 comprises a user-supplied smartphone utilizing a software application to enable remote processing 334 while using the smartphone hardware for communication system 332. In another embodiment, the accessory 330 could be implemented within a charging case for the device 300. In another embodiment, the accessory 330 could be implemented within a companion microphone accessory, which also performs other functions such as off-head beamforming and wireless streaming of the beamformed audio to device 300. Additionally, other wearable device forms could likewise be implemented, including around-the-ear headphones, over-the-ear headphones, audio eyeglasses, open-ear audio devices etc.

Referring to FIG. 1, the set of microphones 114 may include an in-ear microphone. Referring to FIG. 5, such an in-ear microphone could be integrated into the earbud body 316, for example in nozzle 318. The in-ear microphone can also be used for performing feedback active noise reduction (ANR) and voice pickup for communication, which may be performed within other electronics 304. The user's own voice within the ear canal is substantially different than that received from microphones placed outside of the ear canal due to bone and tissue conduction of own voice. The in-ear microphone can provide unique characteristics, in conjunction with other microphones in the set 114, to the mixed audio signal DB 206, user enrollment utterance 210, and mixed audio containing user's self-speech 212, referring to FIG. 2. In conjunction, in-ear and out-ear microphones provide more information to the speech characterization system 103, improving performance of the self-speech filter 104.

According to various implementations, a hearing assist device is provided that will filter the user's self-speech in order to enhance performance. In particular, a self-speech filter 104 that utilizes an intrinsic user vector 112 will remove the user's voice from a mixed audio signal.

It is understood that one or more of the functions of the described systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

What is claimed is:

1. A method of removing user speech for a hearing assist device, comprising:
    receiving an audio signal, wherein the audio signal includes a speech component of the user and a noise component;
    filtering the audio signal with a self-speech filter that utilizes an intrinsic user vector stored with the self-speech filter to filter the speech component, wherein the intrinsic user vector is created offline prior to receiving the audio signal based on a voice input of the user; and
    outputting a filtered audio signal in which the speech component of the user has been substantially removed from the audio signal.

2. The method of claim 1, wherein the self-speech filter includes a machine learning model configured to process the audio signal with the intrinsic user vector, and wherein the intrinsic user vector is determined during an offline session based on utterances of the user and comprises an intrinsic compressed representation of speech patterns of the user.

3. The method of claim 2, wherein the intrinsic compressed representation comprises one of: a d-vector representation or an i-vector representation.

4. The method of claim 1, wherein the self-speech filter comprises a machine learning model that is trained offline according to a method that comprises:
    providing a set of intrinsic user vectors, each corresponding to a unique user, and an associated mixed audio signal for each unique user, wherein each associated mixed audio signal includes a speech component of the unique user and a corresponding noise component;
    inputting into the machine learning model a selected intrinsic user vector and the associated mixed audio signal;
    training the machine learning model to remove the speech component from the associated mixed audio signal based on the selected intrinsic user vector; and
    repeating the inputting and training steps for each intrinsic user vector.

5. The method of claim 1, further comprising:
    post processing the filtered audio signal to generate an enhanced filtered audio signal; and
    outputting the enhanced filtered audio signal to an electroacoustic transducer to generate an acoustic signal.

6. The method of claim 5, wherein the post processing comprises at least one of: speech enhancement, signal-to-noise ratio (SNR) improvement, beamforming, or active noise reduction.

7. The method of claim 1, wherein the hearing assist device comprises a head worn device having at least one earphone and an accessory device in communication with the head worn device.

8. The method of claim 7, wherein the self-speech filter is contained in the accessory device.

9. The method of claim 7, wherein the self-speech filter is contained in the head worn device.

10. The method of claim 7, wherein the hearing assist device includes an earphone having an in-ear microphone in communication with an accessory device.

11. The method of claim 1, wherein the offline session used to determine the intrinsic user vector utilizes a speech characterization system that comprises a machine learning model trained using a database of voice inputs from a plurality of speakers.

12. A system, comprising:
    a memory; and
    a processor coupled to the memory and configured to remove user speech for a hearing assist device according to a method that comprises:
        receiving an audio signal, wherein the audio signal includes a speech component of the user and a noise component;
        filtering the audio signal with a self-speech filter that utilizes an intrinsic user vector to filter out the speech component, wherein the intrinsic user vector is determined offline based on a voice input of the user and is stored with the self-speech filter; and
        outputting a filtered audio signal in which the speech component of the user has been substantially removed from the audio signal.

13. The system of claim 12, wherein the self-speech filter includes a machine learning model configured to process the audio signal with the intrinsic user vector, and wherein the intrinsic user vector is determined during an offline session based on utterances of the user and comprises an intrinsic compressed representation of speech patterns of the user.

14. The system of claim 13, wherein the intrinsic compressed representation comprises one of: a d-vector representation or an i-vector representation.

15. The system of claim 12, wherein the self-speech filter comprises a machine learning model that is trained offline according to a method that comprises:
    providing a set of intrinsic user vectors, each corresponding to a unique user, and
    an associated mixed audio signal for each unique user, wherein each associated mixed audio signal includes a speech component of the unique user and a corresponding noise component;

inputting into the machine learning model a selected intrinsic user vector and the associated mixed audio signal;

training the machine learning model to remove the speech component from the associated mixed audio signal based on the selected intrinsic user vector; and repeating the inputting and training steps for each intrinsic user vector.

16. The system of claim 12, further comprising:

post processing the filtered audio signal to generate an enhanced filtered audio signal; and outputting the enhanced filtered audio signal to an electroacoustic transducer to generate an acoustic signal.

17. The system of claim 16, wherein the post processing comprises at least one of: speech enhancement, signal-to-noise ratio (SNR) improvement, beamforming, or active noise reduction.

18. The system of claim 12, wherein the hearing assist device comprises a head worn device having at least one earphone and an accessory device in communication with the head worn device.

19. The system of claim 18, wherein the self-speech filter is contained in one of the accessory device or the head worn device.

20. The system of claim 18, wherein the earphone includes an in-ear microphone in communication with the accessory device.

21. The system of claim 12, wherein the offline session used to determine the intrinsic user vector utilizes a speech characterization system that comprises a machine learning model trained using a database of voice inputs from a plurality of speakers.

22. The system of claim 12, wherein the self-speech filter includes at least one audio processing enhancement selected from a group consisting of: signal-to-noise ratio (SNR) improvement, beamforming, or active noise reduction.

23. A system, comprising:

a memory; and a processor coupled to the memory and configured to perform a method that comprises:

receiving an audio signal, wherein the audio signal includes a targeted speech component of a non-device user and a noise component;

filtering the audio signal with a targeted speech enhancer that utilizes an intrinsic user vector to substantially pass only the targeted speech component, wherein the intrinsic user vector is determined based on a voice input of the non-device user; and outputting a speech enhanced audio signal substantially containing only the targeted speech component.

\* \* \* \* \*